Figure 1:
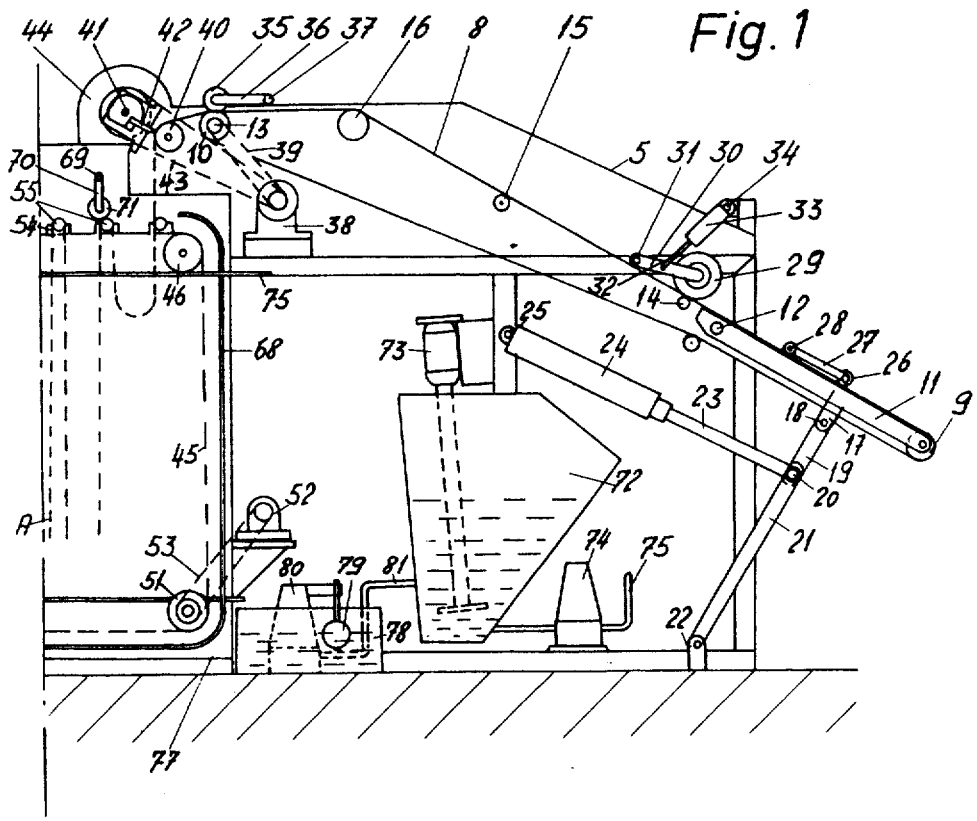

United States Patent

Schiesser

[15] 3,663,135
[45] May 16, 1972

[54] AUTOMATIC MACHINE FOR CUTTING, COOLING, DRYING AND PILING RUBBER SHEETS

[72] Inventor: Walter Hugo Schiesser, Hortensienstrasse 9, Zurich, Switzerland

[22] Filed: June 29, 1970

[21] Appl. No.: 50,761

[30] Foreign Application Priority Data

June 30, 1969 Switzerland ..................10020/69

[52] U.S. Cl. ..................425/73, 425/94, 425/315, 425/455, 425/446, 425/385, 425/163, 425/182, 425/200, 425/217, 425/150, 425/172, 425/214, 83/209, 118/6, 118/7, 118/69, 118/324, 118/503, 118/602, 198/209, 214/6 H
[51] Int. Cl. ...................................................B29c 15/00
[58] Field of Search................18/12 TT, 12 TF, 12 TM, 4 P, 18/4 S; 118/2, 4, 6, 7, 8, 503, 500; 83/1 NQ; 214/6 H, 6 R; 198/1 NQ

[56] References Cited

UNITED STATES PATENTS

| | | |
|---|---|---|
| 2,989,774 | 6/1961 | Erickson et al...........................18/4 P |
| 3,007,585 | 11/1961 | Geisler..................................214/6 H |
| 3,013,671 | 12/1961 | Lamb....................................214/6 H |
| 3,422,168 | 1/1969 | Bowser....................................18/4 P |

*Primary Examiner*—Morris Kaplan
*Attorney*—Browdy and Neimark

[57] ABSTRACT

An automatic machine for cutting, cooling, drying and piling rubber sheets having a separate inlet section, a spray and cooling section and a receiving and piling section joined together so that the three casing sections together form a tunnel open at both ends; conveyor means for the rubber sheet to the inlet section control unit for programming the moving parts of the machine, a trimming device for the sheet, conveying means in the spray and cooling section for conveying transport rods on which the rubber sheets hang, past sprinklers and to a reserve storage for the rods; ventilators for circulating air in the spray and cooling section; conveyor means in the receiving and piling section with hooks extending therefrom adapted to seize a transport rod from said reserve storage and convey it to said piling section; vertically movable receiving means for receiving the sheets, and reciprocating grab assembly means for seizing the sheets as they hang from one of the transport rods and depositing them on the receiving means.

13 Claims, 6 Drawing Figures

INVENTOR.
Walter Hugo Schiesser
BY
Browdy and Neimark
attorneys

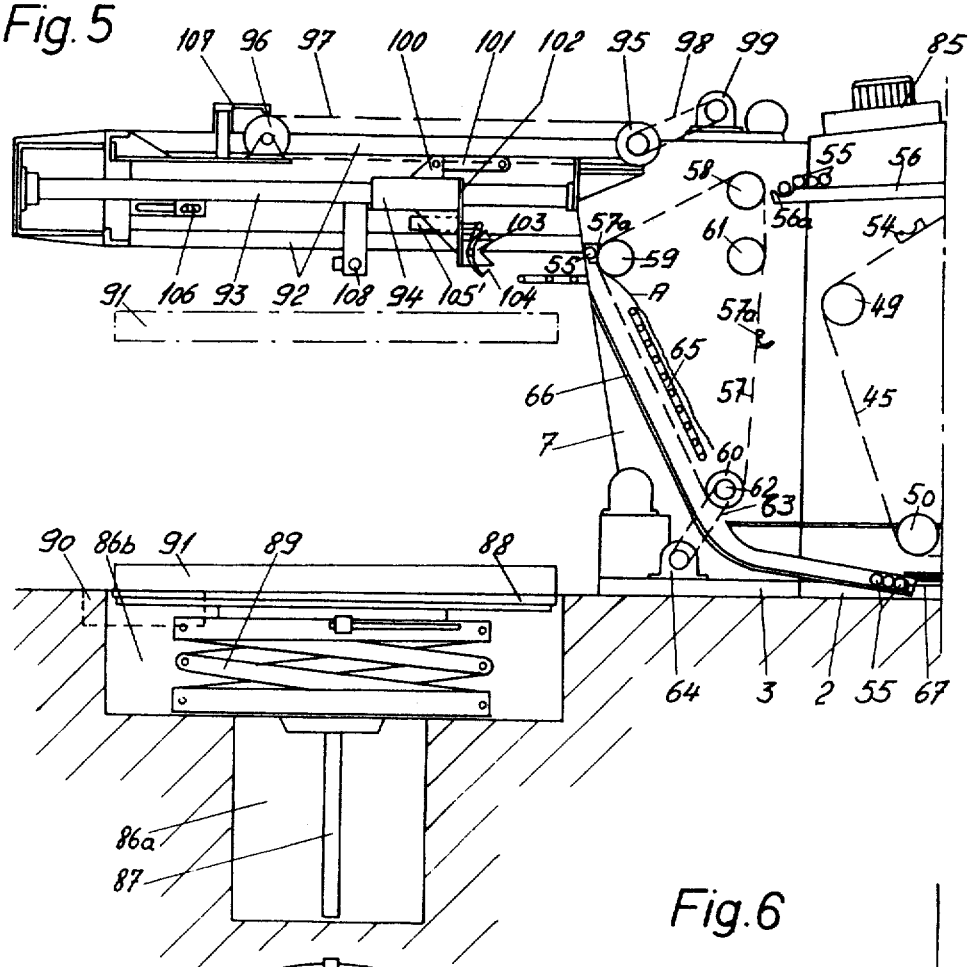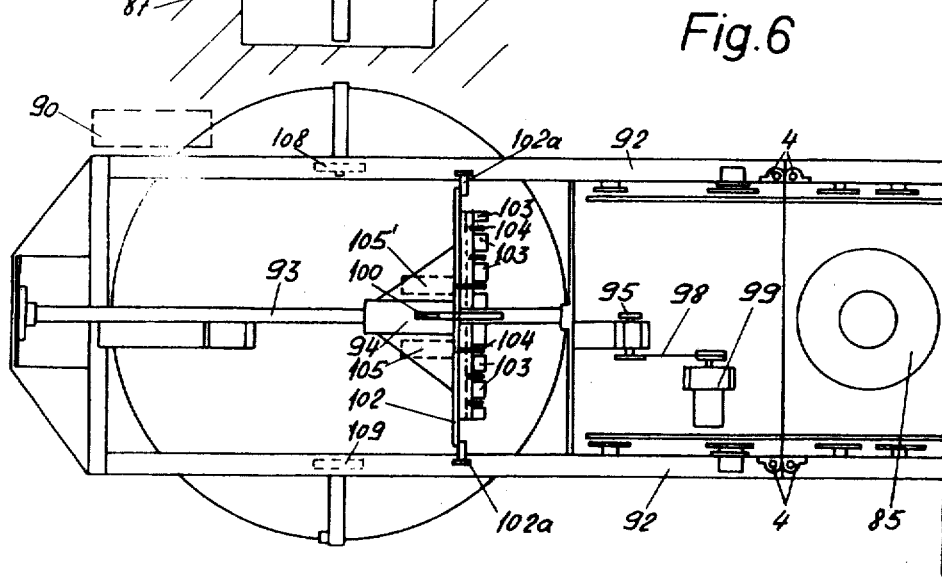

AUTOMATIC MACHINE FOR CUTTING, COOLING, DRYING AND PILING RUBBER SHEETS

Machines already exist for cooling rubber sheets, by which pieces cut off to certain lengths hang over rods in a cooling chamber and so suspended are conveyed through the cooling chamber. With such machines the cooled rubber sheets have to be removed from the rods at the end of the cooling chamber and the rods have to be returned into the guide run at the run-in end of the cooling chamber, where a supply of two or more rods must always be available. This method requires personnel. Now a machine has been invented for the cutting, cooling, drying and piling of rubber sheets which functions entirely automatically by an adjustable program and which, if required, can also be used for treating continuous rubber sheeting in the pressure conveyance procedure.

The invention is an automatic machine for the cutting, cooling, drying and piling of rubber sheets, featuring a separate inlet section, a spray and cooling section and a receiving and piling section, which may be joined together by disconnectable, adjustable screw fastenings, so that the three casing sections together form a tunnel-like casing, open at both ends. An endless conveyor belt rises from the feed side, over which a rubber sheet is inserted from above into the connecting section of the spray and cooling assembly. A return drum, propelled by an electric motor, moving opposite the conveyor belt drives an adjustable measuring apparatus; this, in its turn, activates an automatic adjustable program control unit which controls all movable parts of the machine, in accordance with the program chosen.

Over the entry of the spray and cooling assembly, by means of the program control unit, a controlled trimming fixture is provided for the rubber sheet.

In the spray and cooling section a carrying device is provided, set into motion stepwise at the command of the program control fixture, consisting of two endless chain-type carriers, conducted over the sprocket wheel located over the side frames of the stand, the links of which are provided, at least partly, with open carrying lugs, at regular intervals, projecting outward and opposite each other, intended for the reception of the transport rods on which the continuous rubber sheets, or sections cut into predetermined lengths, hang, and which carry these transport rods together with the rubber sheets suspended thereon from the top of the entry side of the spray and cooling section and from there carry them onto two conveyor rails, disposed on the side frames, forming a reserve store for transport rods with rubber sheets, the delivery ends of which are provided with grooves. On top of the entrance of the spray and cooling section, tubular sprinklers are provided which are fed by a pump with a liquid spraying agent from a supply container by which the rubber sheets are sprayed.

At the delivery end of the side walls and on the ceiling of the casing a number of ventilators are fitted which allow air to circulate in the spray and cooling section. In the receiving and stacking section a conveying device is provided which consists of two endless parallel chain-type carriers, running over the sprocket wheels fixed on the sides of the framework on which, placed opposite each other, two projecting hooks are arranged which chain-type carriers return via the sprocket wheels situated at the ends of the conveying belts opposite, slanting down obliquely over the following sprocket wheels and from there in an opposite inclination further down over the sprocket wheels, driven stepwise by an electric motor and from these sprocket wheels are guided vertically onto the opposite sprocket wheels, situated at the ends of the conveyor belts.

In the base of the receiving and stacking unit a well is provided in which a vertical hydraulic cylinder is firmly fixed which controls the vertical adjustment of a revolving table, and on top of the outlet part of the framework of the receiving and stacking unit a projecting boom, sloping backwards over the table is arranged, on which a grab assembly is carried on an axle rod which is moved back and forth through one of the links of an endless chain control gear, driven by an electric motor over two sprocket wheels located on the carrying belts which grab assembly on reaching its foremost position grips the rubber sheet hanging on one of the transport rods, fitted on the sprocket wheels of the chain-type carriers, pulls it off on its recoil from the transport rod over the table and releases it on reaching an adjustable stop.

Figure 2:
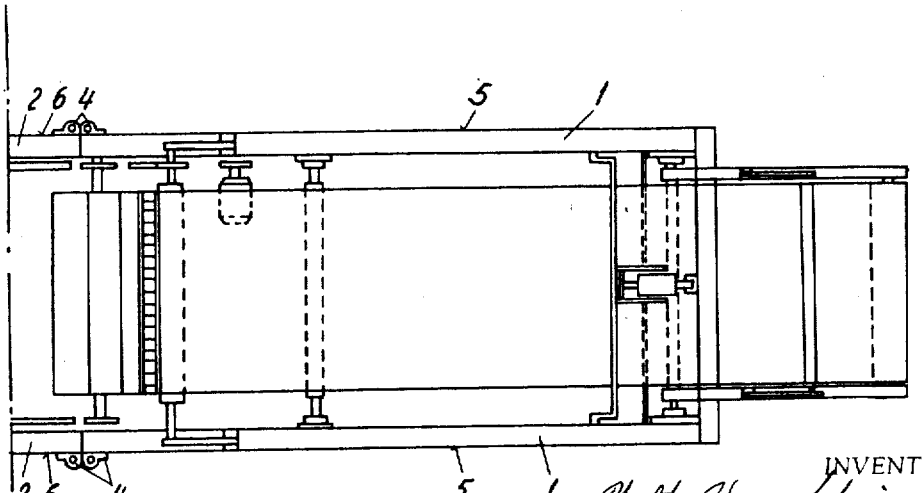
Figure 3:
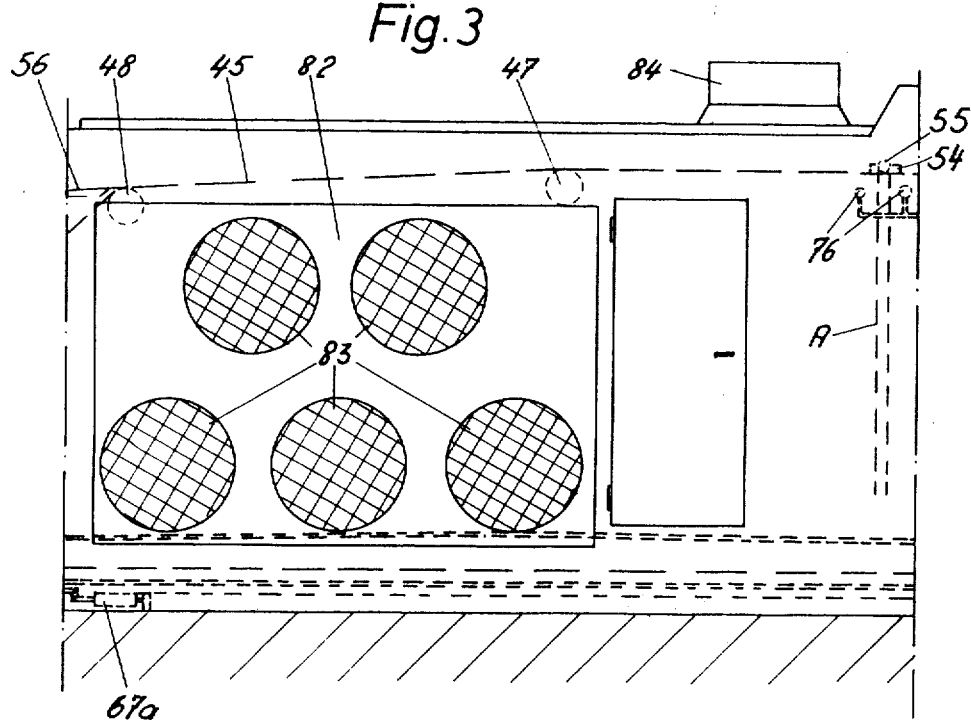
Figure 4:
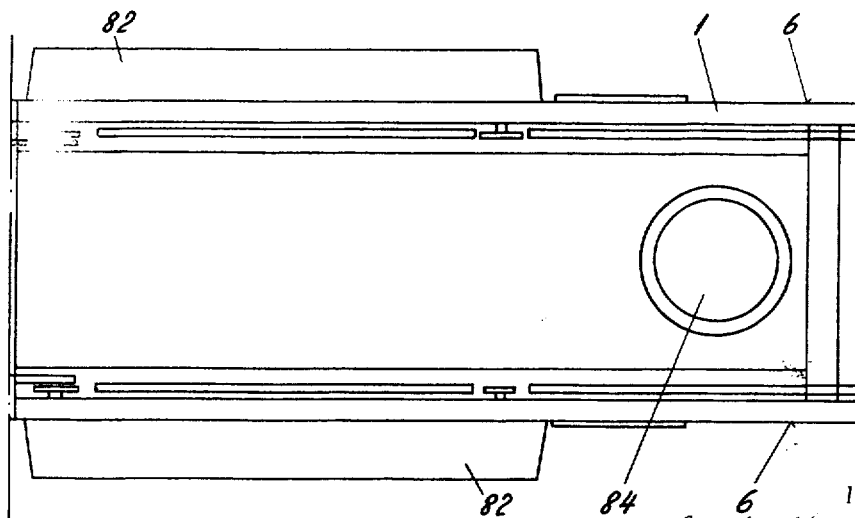

The invention is illustrated schematically by the drawings wherein:

FIG. 1 is a vertical longitudinal section through the inlet part of the machine;
FIG. 2 is a top plan view of the inlet part of the machine;
FIG. 3 is a side view of the middle part of this machine;
FIG. 4 is a top plan view similar to FIG. 3;
FIG. 5 is a vertical longitudinal section through the runout part of the machine; and
FIG. 6 is a top plan view similar to FIG. 5.

The automatic machine for cutting, cooling, drying and piling of rubber sheets consists of three sections, easily assembled or disconnected, namely an intake section, a spray and cooling section, and a receiving and piling section. The division into three sections makes for easy assembly. The intake section framework 1, the spray and cooling section framework 2, and the receiving and piling section framework 3, each with two side beams firmly joined by easily dismantled cross ties are joined by screw fastenings 4, also easily dismantled. Framework 1 is enclosed by a casing 5, framework 2 by a casing 6 and framework 3 by a casing 7, joined by easily dismantled screw fastenings forming a tunnel open at both ends through which a rubber sheet passes.

On top of the intake section of the machine is arranged an endless rising conveyor belt 8 from the feed side running over two reversible rollers 9 and 10. The reversible roller 9 lies at the feed side of the intake platform 11, the other end of which is firmly fixed in an axle 12, situated between the side beams of framework 1. The reversible roller 10 rests on a shaft 13, over the outlet end of framework 1. The upper part of the conveyor belt 8 passes over the rollers 14, 15 and 16 which are journalled in both side frames of section 1.

At the center of the intake platform on the underside a lever 17 is firmly fixed at both sides to receive an axle rod 18. On the inner side of each lever 17, resting on the axle rod 18, rests one end of a lever 19. The other ends of these levers 19 rest on an axle rod 20, on which are also placed the top ends of two support levers 21, the lower ends of which rest on a pillow block 22, fitted on the framework of section 1. In the middle of the axle 20 is engaged the piston rod 23 of the piston engaged in a cylinder 24, pivoted on an axle 25, between the side frames of section 1. In FIG. 1 the intake platform 11 is illustrated at its maximum pivoting position. The piston 23 of the cylinder 24 in this assembly is placed at the front edge and the levers 19 move in the same direction as the supporting levers 21. Now as the piston moves into the cylinder 24 to its limit, the piston rod 23 draws the axle 20 inwards. At the same time the levers 19 and the supporting levers 21 form an angle, with the effect that the entry platform 11 is drawn downwards, until it assumes a vertical position between the side frames of section 1, i.e., into the run-in side of the machine. In this way the entry platform 11 can be included in the framework.

In the center of the entry platform 11 a pressure roller 26 rests on the rubber sheets passing through supported between two rods 27, the other ends of which are fitted in the two side frames of the entry platform 11. At the inner edge of the entry platform 11, above the lever roller 14, is located a further roller 29 on the rubber sheet passing through, which is provided with a stamping ring for marking the rubber sheet as it passes. This second pusher roller 29 is placed between two rods 30, the other ends of which are inserted in a socket 31, situated between the side frames of section 1. A socket placed about the middle of the levers 30 takes the piston rod of a pressure cylinder 33 fitting into a pivoted socket 34 in section 1 above.

Above the roller 10 a roll cylinder 35 is fitted on the conveyor belt 8, supported between two rods 36, the other ends of which fit in the sockets 37 on top of the side frames of section 1. The roller 35 drives an adjustable measuring device which in its turn operates automatic program control gear, the function of which will be described hereafter. The turning drum 10 and with it the transport belt, arranged on a support of section 1, are driven by an electro-motor 38, by means of a V-belt 39 or a chain.

On top of framework 1, projecting over the attached spray and cooling section, a further roller cylinder 40 is arranged over which the rubber sheet is moved, carried by transport belt 8. Opposite this roller cylinder 40 a roller 41 is arranged on the top of framework 1, on which is fitted a radial projecting knife 42, extending over its whole length, operating together with cylinder roller 40, for the accurate cutting of the rubber sheets, carried over roller 40. This beater roller 41, as described hereafter, moves in steps by means of a V-belt 43 or a chain connected to the electric-motor 38, in accordance with the driving signals of the roller 35, operated by its control. The beater roller is enclosed in a protective shield 44.

In the spray and cooling part of the machine a conveying device is provided, consisting of two endless chain-type carriers 45 arranged on both sides, each moving over the sprocket wheels 46, 47, 48, 49, 50 and 51, located on both side frames of section 2. The sprocket wheels 46, arranged vertically above similar wheels 51, guide the rubber sheet downwards as it enters the spray and cooling device. The two sprocket wheels 51, housed on a common shaft, are moved stepwise by an electro-motor 52 over a V-belt 53 or a chain, as described hereafter. The sprocket wheels 47 and 48 are situated at the top of the side frames of section 2, so that the upper parts of the chain-type carriers 45 passes close to the roof of the spray and cooling section. From the sprocket wheels 48 the chain-type carriers 45 slant down to the sprocket wheels 49 and from these in an opposite gradient down further to the sprocket wheels 50 over which they reach the driving sprocket wheels 51. At leas on one part of both chain-type carriers 45, open carriers 54, opposite each other, project outwardly, equidistant from each other, which serve for the reception of the ends of transport rods 55, on which the rubber sheets are supported, as described hereafter. The distance between the carriers 54 following each other corresponds to the length of the step function of the chain-type carriers 45. Behind the sprocket wheels 48, the transport rods 55, together with the rubber sheets A suspended thereon, arranged on the side frames of section 2, are taken over by the transporter belts 56 to reach the receiving and stacking part of the assembly. At the end of these conveyor rails 56, grooves 56a are provided. These grooves 56a form a reserve store which can take up a number of transport rods 55 with rubber sheets A.

In the spray and cooling part joined to the receiving and stacking part of the machine a further conveying device is provided, also consisting of two endless chain-type carriers 57 which run over the sprocket wheels 58, 59, 60 and 61, located on the side frames of section 3. The two sprocket wheels 60 are located on a common shaft 62 and are driven stepwise by a V-belt 63 or a chain by an electric motor 64. On both sprocket chains 57, distributed over their length, two open hooks 57a are arranged which project outward for receiving the transport rod 55. The sprocket wheels 58 are placed opposite the ends of the conveyor belts 56 and from these sprocket wheels 58 the chain-type carriers 57 slant downwardly into the receiving and stacking part via the sprocket wheels 58 and onto the sprocket wheels 60. The sprocket wheels 61 are arranged so that they direct the chain-type carriers reaching them from the sprocket wheels 60 to the sprocket wheels 58, so that the hooks 57a, arranged on these chain-type carriers 57, run exactly along the grooves 56a of the conveyor belts 56 and at that point seize and take with them a transport rod 55 from the grooves 56a. On their way from the sprocket wheel 58 to the sprocket wheel 59, the rubber sheets A, suspended on the transport rods held by the hooks 57a of the chain-type carriers 57, rest on an adjacent rack 65 which is arranged between the two side frames of stand 3 in a roughly parallel slope between the running parts of the chain-type carriers 57 of the sprocket wheels 58 and 60. The chain-type carriers 57 are driven by the electric motor 64 so that at the end of each step the hook 57a is lying outside the sprocket wheel 59. In the interval between the two step functions of the chain-type carriers 57, the rubber sheet A, suspended on the transport rods 55 held by the hooks 57a and lying on the sprocket wheels 59, by a withdrawing device, is grasped and drawn from the transport rod 55, as described hereafter.

At the sprocket wheel 59, the transport rod 55 liberated from the rubber sheet falls off from the hooks 57a into a run guide 66 and rolls down below the sprocket wheels 50 of the conveying device in the spray and cooling section. At the end of the run guide 66, lying below the sprocket wheels 50, a lifting device 67, 67a, activated hydraulically, is provided which is operated and timed by the movement of the sprocket chains 45 and at each operation lifts the transport rod 55, located at the end of the run guide 66 and raises it over the chains 54 of the chain-type carrier 45, situated below the sprocket wheels 50. At the next step function of the transport chain 45, the relative transport rod 55 is taken along by the carriers 54 and brought onto two guide rods 68, fastened on two side frames of section 3 which extend from the sprocket wheels 50 up to the sprocket wheels 51, then up and over the sprocket wheels 46. These guide rods 68 are located at such a distance from the sprocket wheels 50, 51 and 46 so that they force the transport rods 55 into the carriers 54 during their movement from the sprocket wheels 50 to the sprocket wheels 46. Over the carriers 54, advanced by a one-step function from the sprocket wheels 46, of the chain-type carrier 45, an axle rod 69 is inserted between the side frames of section 2 on which are stored the ends of two levers 70, carrying a clamping roller 71 between their other ends, clamping thereby the rubber sheet A, hanging on the transport rod 55 of these carriers and holding it fast to the transport rod.

At the feed side of the machine is fixed a tank 72 for the spraying agent, preferably water, to which a lubricating agent such as talcum powder is added. This tank is provided with an agitator or stirring device. From this tank 72 the spraying agent passes through an electric motor driven pump 74 through a pipe conduit 75 to two or more sprinkler tubes 76 which are housed on top of the front part of the spraying chamber of the spray and cooling section. Through these spray tubes 76 the rubber sheets A hanging from the transport rods 55 are sprayed. The spraying agent sprinkles down from the rubber sheets A and is caught in a basin 77 at the bottom of the spray and cooling part of the machine and thence flows to an intermediate container 78 in the loading section of the machine. A pump 80, attached to the intermediate container 78, electrically driven through a float 79 in the intermediate container 78 pumps the spraying agent, collected in the intermediate container 78, through a pipe 81 back into the storage tank 72, as soon as the fluid in the intermediate container 78 exceeds a certain level. The side walls of the casing section 6 of the spray and cooling part of the machine, behind the spray room, each have a recess 82. In each recess 82 a number of ventilators 83 are placed, in the case under consideration five are illustrated, which permit the flow of outdoor air into the cooling room for the cooling of the rubber sheets A, hanging from the transport rods 55. In the casing of section 6 is a vent 84 for the outflow of air and steam. At the rear end of the sloping ceiling section of the casing 6, a further ventilator 85 is provided which forms an air curtain in the cooling room, forcing the air introduced into the cooling room by the ventilators 83 towards the spraying room.

Under the base of the receiving and stacking part of the machine, a well 86a is provided, which increases in diameter at the top 86b. The narrower well 86a contains a vertical pressure cylinder 87 which is fixed, the piston rod of which exerts thrust on a round table 88 on a telescopic support 89 between two vertical and slideable boundaries. The lower edge of the table 88 is flush with the base. The table 88 revolves and can be turned by means of an electric propulsion device 90 stepwise through 180°, as described hereafter. On the table 88 a loading palette 91 is fitted for the piling of rubber sheets A.

Section 3 of the receiving and stacking part of the machine has on top of the outlet a boom 92 which extends over the table 88. In the longitudinal section of this boom 92, a horizontal side arm 93 is fixed. On this side arm 93 is a sliding cylinder 94. Over the side arm 93 two sprocket wheels 95 and 96 are fixed over which runs an endless chain 97. The sprocket wheel 95 is driven by a V-belt of an electric motor 99, housed on top of section 3 of the receiving and stacking unit. On top of the sliding cylinder 94 is located bracket 100, the other end of which is hinged to a link of the chain 97. The sliding cylinder 94 is moved back and forth by a steering device 101, as the chain 97 rotates. At the outlet end of the boom 92, at the end of the sliding cylinder 94 a supporting plate 102 is fastened which moves along joists 102a on both sides of the boom 92. On this supporting plate 102, distributed over its entire width, grippers 103 are fastened which are adjusted to the same height as the sprocket wheels 59 of the receiving and stacking section of the machine. Between two grippers 103, gripping tongs 104 are located on the supporting plate 102. The gripping tongs 104 open and close by means of two interacting pressure cylinders 105 and 105'. The pressure cylinder 105 is energized by the transport rods 55, held on the hooks 57a of the sprocket wheels 59 as they approach at intervals. As the transport rod 55 is grasped by the gripper 103, the pressure cylinder 105 is operated, so that the tongs 104 close on the rubber sheet A, hanging from its transport rod 55 and the sliding cylinder 94 recoils, drawing it off, so that it lies over the table 88, on palette 91. Now as the pressure cylinder 105' strikes an adjustable stop 106, located on boom 92, a reverse movement of the pressure cylinders 105 and 105' takes place. As this happens, power is transferred from the pressure cylinder 105 to the pressure cylinder 105', causing the gripping tongs 104 to open and to release the rubber sheet A, so that this rubber sheet A is deposited on the palette 91. On the outside of the boom 92 a control switch 107 over the sprocket wheel 96 is attached which lifts when the pivotal point of the steering device 101 passes below it on the chain 97. As it rises, the control switch 107 operates the driving device 90 and turns the table 88 through 180°. On both side frames of the boom 92 and on both sides of the center of table 88, two struts pointing downwardly are arranged, on one of which a light socket 108 and on the other a photo-cell 109 are fixed. The light socket 108 and the photo-cell 109 are situated a little higher than the topmost position of the palette 91 lying on the table 88, dash-dotted in FIG. 5. The operation of the photo-cell 109 controls the pressure pump for the pressure cylinder 87 in such a way that the table 88 is lowered by one step every time that the beam of the light source 108 is interrupted by a rubber sheet A, deposited on the pallette 91. On the sides of the machine are provided emergency switches by means of which the mechanism or parts of it can be stopped, if required.

The described automatic machine for the cutting, drying and piling of rubber sheets is placed a short distance from the outlet end of the roller mill. While loading the material into the roller, the inlet table 11 of the machine is clamped in its lowest position in the intake section, so that the worker or workers of the automatic machine for cutting, cooling, drying and piling of rubber sheets have sufficient space between the rolling mill and the automatic machine to work in. When the rolling mill is ready for the rolling of a rubber sheet, the feed table 11 is raised by means of the cylinder 24 into the position as represented in FIG. 1. The control gear will previously have been set on the program desired and the required length of the rubber sheets A. The stop 106 will also be adjusted, so that the folded rubber sheets A are always laid exactly on the center of the palette 91. At the start of the work, the table 88, together with the palette 91 set on it, is raised into the highest position as shown on the dash-dotted FIG. 1.

The rubber sheet coming from the rolling mill is laid out over the transport belt 8 and carried along by it. Above the lever roller 14, the impress ring of the mangle type roller 29 stamps the required designation on the rubber sheets as they pass through. At the beginning the chain-type carriers 45 are not moving. The rubber sheet runs between the reverse roller 10 of the transport belt 8 and the roller 40, to the intake of the spray and cooling section of the machine, so that it hangs downwardly near the transport rod 55 which is immediately over the carrying lugs 54 of the chain-type carriers 45, moving over the sprocket wheels 46. The introduction of the rubber sheet runs beneath the roller 35 raising it a little; this has the effect of setting the automatic control device in motion and the measuring apparatus begins to work. When the measuring device indicates a predetermined length of the rubber sheet passing below the roller 35, the control device gives a starting signal to the electric motor 52 with the result that the control device advances the chain-type carrier 45 by one step, the length of which corresponds to the distance between two adjacent carriers, whereupon the electric motor is again automatically switched off. In this step-by-step control of the chain-type carriers 45, the transport rod 55 held in the carrying lugs 54 carries the rubber sheet hung from it up to the clamping roller 71 which firmly holds the rubber sheet onto the transport rod 55. However, the rubber sheet continues its run and forms now a downwardly hanging loop between the aforementioned transport rod 55 as can be seen in FIG. 1. At the signal from the measuring device, the roller 41 receives a starting order from the control device so that the rubber sheet is cut through when that part of it running over the roller 40 has reached the required length. The end of the cut off rubber sheet A falls down. The timing of the start-up commands of the electric motor 52 and the roller 41 are chosen so that the rubber sheets A hanging from the transport rods 55 are of the same lengths. If necessary, the start-up instructions for the electric motor 52 and for the roller 41 can also be given by a photo-electric cell. For this purpose a light beam and opposite it a photo-cell with vertical height adjustment can be arranged below in the inlet part of the spray and cooling section so that the rubber sheet, running down from the roller 40, hangs over the gap between the light beam and the photo-cell. As the rubber sheet passes between the light beam and the photo-cell, it interrupts the light beam focused on the photo-cell and so gives a starting signal to the electric motor 41. The cutting-off process repeats itself continuously. The cut-off rubber sheets A, suspended on the transport rods 55, are carried thereby stepwise through the spray and cooling section of the machine and sprayed as they enter by the sprinkler tubes 76 with liquid spraying agents to which a separating compound, for instance talcum powder, is added to prevent the rubber sheets from sticking together. In the next part of the spray and cooling section, the rubber sheets A are further air-cooled and dried by air drawn through the ventilators 83 and 85. At the end of the spray and cooling section of the machine, behind the sprocket wheels 48, the transport rods 55 with the rubber sheets A hanging from them are taken over by the carrying belts 56, forming a reserve store.

The electric motor 64 receives starting signals from the controlling unit at regular intervals, adjusted so that the chain-type carriers 57 halt after each step. The chain-type carriers 57 are, however, driven independently of the chain-type conveyors 45, enabling it to make a longer step. When the chain-type carriers 57 are at rest, one of the carrying lugs 57a is positioned on sprocket wheel 59 at each step. At each step of chain-type conveyor 57, one of the carriers 57a seizes the transport rod 55, lying in the notches 56a of the carryable belts 56 and carries it into the outlet position of the sprocket wheels 59. The chain carrying belt 97 is driven continuously by the electric motor 99. By means of this chain-type carrier 97, the sliding cylinder 94 moves forward, then backwards, along the rod 93. The movements of the chain 97 and the carrying chains 57 accord with each other so that the sliding cylinder 94 reaches the forward position as the chain-type carriers 57 complete one step. When the sliding cylinder 94 reaches the forward position, the grips fitted on the bracket meet the rubber sheet A, hanging on the transport rod 55, held by the carriers 57a, located outside the sprocket wheels 59 of the chain-type carriers 57. This causes the hydraulic cylinder 105 to be charged with fluid, while 105' discharges at the same moment, thus closing the gripping tongs 104. These grips 104 thereby seize the rubber sheet A and as the sliding cylinder 94 is reversed draw it over the palette 91 laid on the table 88. When the sliding cylinder 94 reaches the stop 106, the reverse movement takes place, the cylinder 105' is discharged and the hydraulic cylinder 105 is charged. This causes the tongs 104 to open and release rubber sheet A, depositing it in the center of the table 88 on the palette 91. As the steering device 101, running on the chain 97, reaches a position below the switching lever, as the sliding cylinder 94 reverses, a switch 107 is operated which switches on the turning device 90, which thereupon in accordance with the movement of the sliding cylinder 94 turns the table 88, together with palette 91, laid on it, through 180°, when the turning device 90 is automatically switched off. As the table 88 turns after each deposit of a rubber sheet A on the palette 91, the folded parts of the rubber sheets A, which are bulkier, will be deposited alternately on one side or the other, so that the pile of rubber sheets A so heaped inclines on one side or the other. The rotary motion of the table must take place comparatively slowly and it is, accordingly, slowed down by a brake, so that the table 88 stops in practice without shock to prevent the rubber sheets A piled on palette 91 from being displaced or upset. When this pile of rubber sheets A reaches such a height that a further rubber sheet A deposited, interrupts the light beam thrown upon the photo-cell 109, by the light source 108, the switching off of the current of the photo-cell 109 gives a signal to the steering device of the pressure cylinder 87, the piston rod of which, together with the table 88, is thereby lowered a step. When the table 88 finally reaches its lowest point, a visual or sound alarm is operated showing that the palette 91 must be changed.

The storage unit inserted between the spray and cooling section and the receiving and stacking section of the machine, formed by the carrying belts 56 for the transport rods 55 with rubber sheets A, has the great advantage that these parts of the machine can work independently of each other. When the transport rods 55 with rubber sheets A are collected in this storage feature, they will be handled by the receiving and stacking assembly and when the full charge of the rolling mill has been finally rolled off, a new loading begins, during which time the intake section and the conveying device of the spray and cooling part are at a standstill.

If a rubber sheet, leaving the rolling mill, is to be stacked in one piece, that is to say not cut into lengths as rubber sheets A, cooled, dried and folded, then the cutting roller 41 and the energizing device 90 for turning the table 88 are switched off.

The great advantage of the automatic machine for cutting, cooling, drying and piling rubber sheets is the fact that it can be operated, supervised and maintained by a single operator.

It will be obvious to those skilled in the art that various changes may be made without departing from the scope of the invention and the invention is not to be considered limited to what is shown in the drawings and described in the specification.

What is claimed is:

1. An automatic machine for cutting, cooling, drying and piling sheets comprising a separate inlet section, a spray and cooling section and a receiving and piling section, a casing in each section, said sections being removably joined together so that the three casings form a tunnel open at both ends;
a plurality of transport rods supported on said sections by their ends;
a trimming device for said sheet,
conveying means for feeding sheet to said inlet section, to said trimming device and thence over a transport rod over which it hangs,
sprinkling means in said spray and cooling section for spraying said sheets,
ventilator means for circulating air in the spray and cooling section,
reserve storage means at the end of said spray and cooling section for said loaded transport rods,
conveying means said spray and cooling section for conveying said loaded transport rods past said sprinkling means and said ventilator means to said reserve storage means,
vertically movable receiving means for receiving said sheets in a pile,
reciprocating grab assembly means for seizing said sheet as it hangs from one of said transport rods and depositing it on said receiving means;
conveying means in said receiving and piling section with hooks extending therefrom for seizing a transport rod from said reserve storage and conveying it to said grab assembly, and
means for returning said empty transport rods to said spray and cooling section for receiving additional sheets.

2. A machine according to claim 1 further comprising adjustable measuring apparatus, control means for controlling all movable parts of said machine, means permitting said measuring apparatus to activate said control means.

3. A machine according to claim 1 wherein said vertically movable receiving means comprises a revolving table actuated by a vertical hydraulic cylinder arrangement.

4. A machine according to claim 1 wherein said reciprocating grab assembly comprises a boom extending over said receiving means which carries an axle rod and a grab assembly which travels thereon.

5. A machine according to claim 1 wherein said conveyor means for feeding sheet to said inlet section comprises an endless conveyor belt having an input end with an input roller thereon, an input platform located at said input end, said input platform being firmly fixed at its upper end about an axle, and means for pivoting said input platform about said axle from its working position to a closed position completely within said inlet section.

6. A machine in accordance with claim 1 wherein means are provided along said conveyor means to said inlet section for pressing a desired designation onto said sheet as it passes therethrough.

7. A machine in accordance with claim 1 wherein carrying lugs are provided on the conveying means in said spray and cooling section, said lugs being adapted to carry said transport rods, and said means for returning empty transport rods comprising a channel guide below said conveying means in said receiving and piling section adapted to collect empty rods leaving said hooks and guide them to a point below said conveying means in said spray and cooling section, lifting means for lifting a transport rod from said channel guide and into said carrying lugs.

8. A machine in accordance with claim 4 wherein said reciprocating grab assembly comprises a sliding cylinder moving on said axle rod, a supporting plate fitted at the end of said cylinder and capable of moving therewith along said boom, a plurality of grips arranged across said supporting plate and adapted to grip said sheet, means for opening and closing said grips, means for moving said sliding cylinder along said boom after said grips have closed on said sheet to a position where said sheet is lying on said receiving means and thereupon opening said grips.

9. A machine in accordance with claim 1 further comprising a light beam and photocell mounted on opposite sides of said receiving and piling section, control means for controlling the vertical location of said receiving means, said photocell actuating said control means to lower said receiving means a step each time that a sheet is deposited thereon thereby interrupting said light beam.

10. A machine in accordance with claim 8 further comprising a light beam and photocell mounted on opposite sides of said boom, control means for controlling the vertical location of said receiving means, said photocell actuating said control means to lower said receiving means a step each time that a sheet is deposited thereon thereby interrupting said light beam.

11. A machine in accordance with claim 1 wherein said vertically movable receiving means comprises a revolving table, a vertical hydraulic cylinder for actuating said revolving table vertically, and control means for actuating said hydraulic cylinder to lower said table a step each time that a sheet is deposited thereon.

12. A machine in accordance with claim 11 further comprising means for rotating said table 180° each time that a sheet is deposited thereon.

13. A machine in accordance with claim 1 wherein said trimming device comprises a roller having a projecting cutting blade therein extending over its entire length.

* * * * *